United States Patent
Gumpoltsberger

(10) Patent No.: US 7,211,021 B2
(45) Date of Patent: May 1, 2007

(54) MULTI-SPEED GEARBOX

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 216 days.

(21) Appl. No.: 10/518,002

(22) PCT Filed: Jul. 5, 2003

(86) PCT No.: PCT/EP03/07221

§ 371 (c)(1),
(2), (4) Date: Dec. 15, 2004

(87) PCT Pub. No.: WO2004/007997

PCT Pub. Date: Jan. 22, 2004

(65) Prior Publication Data

US 2005/0209043 A1    Sep. 22, 2005

(30) Foreign Application Priority Data

Jul. 11, 2002    (DE) ................. 102 31 413

(51) Int. Cl.
*A16H 3/62*    (2006.01)
(52) U.S. Cl. ................. 475/275; 475/276; 475/286; 475/323; 475/330
(58) Field of Classification Search ............ 475/275, 475/276, 277, 278, 279, 286, 323, 330
See application file for complete search history.

(56) References Cited

U.S. PATENT DOCUMENTS

| | | |
|---|---|---|
| 4,395,925 A | 8/1983 | Gaus |
| 5,106,352 A | 4/1992 | Lepelletier |
| 5,295,924 A | 3/1994 | Beim |
| 5,342,257 A | 8/1994 | Hotta et al. |
| 5,435,792 A | 7/1995 | Justice et al. |

(Continued)

FOREIGN PATENT DOCUMENTS

DE    689 07 338    11/1993

(Continued)

OTHER PUBLICATIONS

Tenberge, Prof. Dr. P., "E-Automat Automatikgetriebe mit Esprit", *VDI-Berichte*, Nr. 1610, VDI Verlag GmbH-Düsseldorf, Germany, Jun. 20, 2001, pp. 455-479.

*Primary Examiner*—David D. Le
(74) *Attorney, Agent, or Firm*—Davis Bujold & Daniels, P.L.L.C.

(57) ABSTRACT

The multi-step reduction gear includes a drive shaft and an output shaft, having three single rod planetary gears, seven rotating shafts and six shifting elements, whose selective engagement realizes seven forward gears and one reverse gear, the drive takes place through a shaft, connected with the sun wheel of the first planetary gears. The output takes place through a shaft in connection with the annulus of the second planetary gear and the annulus of the third planetary gears. A shaft is connected with the rod of the first planetary gears; a shaft is connected with the rod of the second planetary gears and the rod of the third planetary gears; a shaft is connected with the annulus of the first planetary gear set; a shaft is connected with the sun wheel of the third planetary gears; a shaft is connected with the sun wheel of the second planetary gears.

21 Claims, 3 Drawing Sheets

U.S. PATENT DOCUMENTS

| | | | |
|---|---|---|---|
| 5,455,767 A | 10/1995 | Staerker | |
| 5,514,050 A | 5/1996 | Bäuerle et al. | |
| 5,913,746 A | 6/1999 | Bäuerle | |
| 6,053,839 A | 4/2000 | Baldwin et al. | |
| 6,083,135 A | 7/2000 | Baldwin et al. | |
| 6,139,463 A | 10/2000 | Kasuya et al. | |
| 6,217,474 B1 | 4/2001 | Ross et al. | |
| 6,425,841 B1 | 7/2002 | Haka | |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,634,981 B1 * | 10/2003 | Raghavan et al. | 475/275 |
| 6,648,789 B1 * | 11/2003 | Usoro et al. | 475/276 |
| 6,652,409 B2 * | 11/2003 | Kao et al. | 475/275 |
| 6,659,903 B1 * | 12/2003 | Bucknor et al. | 475/276 |
| 6,659,904 B1 * | 12/2003 | Usoro et al. | 475/276 |
| 6,672,988 B1 * | 1/2004 | Raghavan et al. | 475/276 |
| 6,723,018 B2 | 4/2004 | Hayabuchi et al. | |
| 2003/0054917 A1 | 3/2003 | Raghavan et al. | |
| 2003/0083174 A1 | 5/2003 | Tabata et al. | |
| 2003/0203784 A1 | 10/2003 | Usoro et al. | |
| 2004/0097324 A1 | 5/2004 | Ziemer | |
| 2004/0116238 A1 | 6/2004 | Ziemer | |

FOREIGN PATENT DOCUMENTS

| | | |
|---|---|---|
| DE | 691 16 480 | 6/1996 |
| DE | 199 12 480 A1 | 9/2000 |
| DE | 199 49 507 A1 | 4/2001 |
| DE | 199 43 751 A1 | 6/2001 |
| DE | 102 00 379 A1 | 8/2002 |
| DE | 102 13 820 A1 | 10/2002 |
| DE | 102 50 374 A1 | 6/2003 |
| DE | 102 31 350 A1 | 1/2004 |
| EP | 0 434 525 A1 | 6/1991 |
| EP | 0 378 900 | 6/1993 |
| EP | 1 411 269 A2 | 4/2004 |
| GB | 1 522 616 | 8/1978 |
| JP | 04-119245 | 4/1992 |
| JP | 2000-234664 | 8/2000 |
| JP | 2000-291747 | 10/2000 |
| JP | 2001-082555 | 3/2001 |
| JP | 2002-323098 | 11/2002 |
| WO | WO-02/079670 A2 | 10/2002 |
| WO | WO-02/079671 A2 | 10/2002 |
| WO | WO 03/095865 | 11/2003 |

* cited by examiner

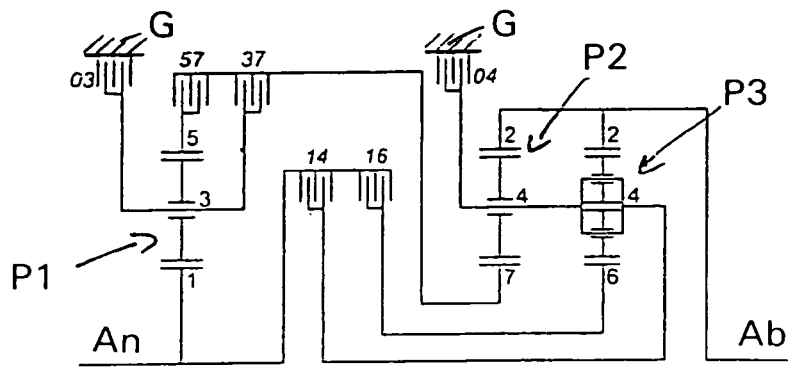
Fig. 1
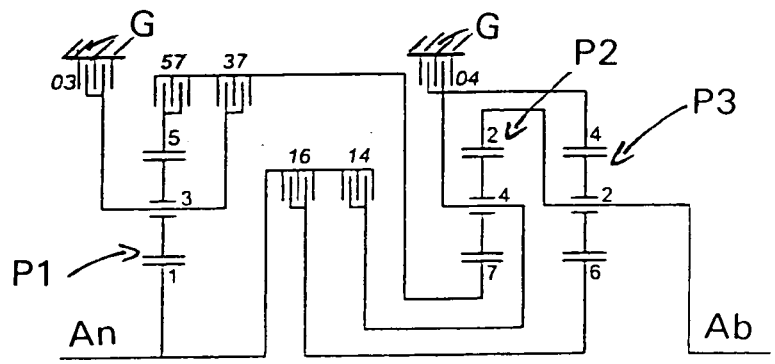
Fig. 2
| Gear : | 03 | 04 | 15 | 16 | 37 | 57 | i | φ |
|---|---|---|---|---|---|---|---|---|
| 1 | ● | ● |  |  |  | ● | 4.54 | |
| | | | | | | | | 1.70 |
| 2 | ● | ● |  | ● |  |  | 2.67 | |
| | | | | | | | | 1.34 |
| 3 | ● |  |  | ● |  | ● | 1.99 | |
| | | | | | | | | 1.37 |
| 4 | ● |  |  | ● | ● |  | 1.46 | |
| | | | | | | | | 1.46 |
| 5 | ● |  | ● | ● |  |  | 1.00 | |
| | | | | | | | | 1.37 |
| 6 | ● |  |  | ● | ● |  | 0.73 | |
| | | | | | | | | 1.16 |
| 7 | ● |  |  | ● |  | ● | 0.63 | |
| | | | | | | | | 0.59 |
| R |  | ● |  |  | ● | ● | -2.68 | |
| | | | | | | | | 7.24 |
Fig. 3

MULTI-SPEED GEARBOX

This application is a national stage completion of PCT/EP2003/007221 filed Jul. 5, 2003 which claims priority from German Application Serial No. 102 31 413.6 filed Jul. 11, 2002.

FIELD OF THE INVENTION

The present invention concerns a multi-step reduction gear in planetary construction, especially an automatic transmission for a motor vehicle.

BACKGROUND OF THE INVENTION

Automatic transmissions, especially for motor vehicles, include planetary gear sets according to the state of the art, which are shifted using friction or shifting elements, such as clutches and brakes, and are usually connected with a starting element subject to a slipping action and are optionally provided with a bridging clutch, such as a hydrodynamic torque converter or a hydraulic clutch.

A transmission of this type emerges from EP 0 434 525 A1. It basically includes a drive shaft and an output shaft, which are arranged parallel to each other, and a double planetary gear set arranged concentrically in relation to the output shaft, and five shifting elements in the form of three clutches and two brakes, whose selective blockage respectively determines in pairs the various gear ratios between the drive shaft and the output shaft. Hereby, the transmission has a control gear and two power paths, so that six forward gears can be attained through the selective engagement in pairs of the five shifting elements.

Hereby two clutches are needed in connection with the first power path to transmit the torque from the control gear set to two elements of the double planetary gear set. These are basically arranged behind the control gear set in the direction of the double planetary gears in the direction of the flow of force. A further clutch is provided in connection with the second power path, which detachably connects this with a further element of the double planetary gears. Hereby the clutches are arranged in such a way that the internal disk support forms the output.

Furthermore, a compact multi-step reduction gear in planetary construction, especially for a motor vehicle, is known from the publication U.S. Pat. No. 6,139,463, which has two planetary gears and a control gear set, as well as three clutches and two brakes. Two clutches C-1 and C-3 are provided with this known multi-step reduction gear in connection with a first power path for transmitting the torque from the control gears to the two planetary gears. Here the external disk support or the cylinder or the piston or the pressure compensation side of clutch C-3 is connected with a first brake B-1. Moreover the internal disk support of the third clutch C-3 is connected with the cylinder or piston or pressure compensation side of the first clutch C-1, whereby the internal disk support of the first clutch C-1 is arranged on the output side and is connected with a sun wheel of the third planetary gear set.

Moreover, a multi-step reduction gear is known from DE 199 49 507 A1 of the Applicant, in which two non-shiftable control gears are provided on the drive shaft, which generate two RPMs on the output side that can, in addition to the RPM of the drive shaft, be shifted electively to a shiftable double planetary gears acting on the output shaft through selective closing of the shifting elements used in such a way that in each case only one shifting element of the two shifting elements just activated must be engaged or disengaged for shifting from one gear into the respectively next following higher or lower gear.

Furthermore, an automatically shiftable motor vehicle transmission with three single rod planetary gears, as well as three brakes and two clutches for shifting from six forward gears and one reverse gear and, with a drive as well as an output shaft, is known from DE 199 12 480 A1. The automatically shiftable motor vehicle transmission is constructed in such way that the drive shaft is directly connected with the sun wheel of the second planetary gear and that the drive shaft can be connected with the sun wheel of the first planetary gears through the first clutch and/or through the second clutch with the rod of the first planetary gears. In addition or as an alternative, the sun wheel of the first planetary gears can be connected through the first brake with the housing of the transmission and/or the rod of the first planetary gears through the second brake with the housing and/or the sun wheel of the third planetary gears through the third brake with the housing.

The present invention is based upon the objective of proposing a multi-step reduction gear of the type stated at the beginning in which the construction expenditure is optimized and, moreover, the degree of efficiency in the main driving gears is improved with respect to drag and gearing losses. Additionally, low torques should be acting on the shifting elements and planetary gears in the multi-step reduction gear of the invention and the RPMs of the shafts, shifting elements and planetary gears should be kept as low as possible. Furthermore, the number of gears as well as the transmission ratio spread should be increased.

SUMMARY OF THE INVENTION

Accordingly, a multi-step reduction gear in planetary construction of the invention is proposed, which has a drive shaft and an output shaft, which are arranged in a housing. Furthermore, at least three single rod planetary gears, at least seven rotating shafts, as well as at least six shifting elements including brakes and clutches, are provided; the selective engagement of which effects various reductions between the drive shaft and the output shaft so that preferably seven forward gears and one reverse gear can be realized.

In accordance with the present invention, in connection with the multi-step reduction gear, it is provided that the drive is effected through a shaft, which is continuously connected with the sun wheel of the first planetary gears and, in such a way, the output is effected through a shaft, which is connected with the annulus of the second planetary gears and an element of the third planetary gears. Furthermore, the multi-step reduction gear of the invention provides that a third shaft is continuously connected with the rod of the first planetary gears; a fourth shaft is continuously connected with the rod of the second planetary gears as well as a further element of the third planetary gears; a fifth shaft is continuously connected with the annulus of the first planetary gears; a sixth shaft is continuously connected with the sun wheel of the third planetary gears; a seventh shaft is continuously connected with the sun wheel of the second planetary gears, whereby the planetary gears are coupled by means of shafts and shifting elements.

In the framework of a preferred embodiment, the output shaft is connected with the annulus of the second planetary gears and the annulus of the third planetary gears whereby, in this case, the fourth shaft is connected with the rod of the second and the rod of the third planetary gears and the first planetary gears and the second planetary gears are constructed as negative planetary gears and the third planetary gears as positive planetary gears.

In accordance with a further embodiment, the output shaft is connected with the annulus of the second planetary gears and the rod of the third planetary gears whereby, in this case, the fourth shaft is connected with the annulus of the third planetary gears and the rod of the secondary planetary gears. Hereby the three planetary gears are constructed as negative planetary gears.

Several suitable reductions, as well as a considerable increase of the overall spread of the multi-step reduction gear, are the result of this configuration of the multi-step reduction gear in accordance with the invention, owing to which an improvement in driving comfort, and a significant reduction in consumption are brought about.

The multi-step reduction gear of the invention is suitable for any motor vehicle, especially for passenger cars and for commercial motor vehicles, such as for example, trucks, busses, construction vehicle, rail vehicles, caterpillar vehicles and the like.

In addition, the construction expenditure is significantly reduced with the multi-step reduction gear of the invention because of the low number of shifting elements, preferably four clutches and two brakes. With the multi-step reduction gear of the invention, it is advantageously possible to conduct a start with a hydrodynamic converter, an external starting clutch or also with other suitable external starting elements. It is also conceivable to enable a starting procedure with a starting element incorporated into the transmission. Preferably a shifting element, which is activated in first gear and in reverse gears, is suitable.

In addition, the multi-step reduction gear of the invention results in a good degree of efficiency in the main driving gears with respect to drag and gearing losses.

Moreover, low torques are present in the shifting elements and the planetary gears of the multi-step reduction gear, owing to which, the wear and tear on the multi-step reduction gear, is advantageously reduced. Furthermore, due to the low torques, a correspondingly small dimensioning is made possible, owing to which the space required and the corresponding costs, can be reduced. In addition, low RPMs are also present in the shafts, shifting elements and planetary gears.

Furthermore, the transmission of the invention is designed in such a way that an adaptability to different power train configurations in the direction of the force flow, as well as with respect to space, is made possible.

BRIEF DESCRIPTION OF THE DRAWINGS

The invention will now be described, by way of example, with reference to the accompanying drawings in which:

FIG. 1 represents a schematic view of a preferred embodiment of a multi-step reduction gear of the invention;

FIG. 2 represents a schematic view of an additional preferred embodiment of a multi-step reduction gear of the invention;

FIG. 3 represents a shifting diagram for the multi-step reduction gear of the invention in accordance with FIG. 1 and FIG. 2;

DETAILED DESCRIPTION OF THE INVENTION

Figure 4:
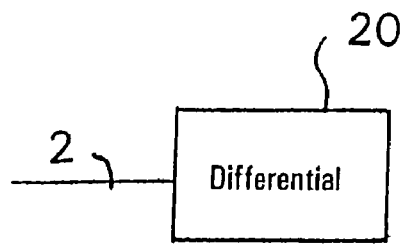
FIG. 4 is a diagrammatic view of an embodiment of the multi-step transmission having a differential.

FIG. 1 shows the multi-step reduction gear of the invention with a drive shaft 1 (An), and an output shaft 2 (Ab), which are arranged in a housing G. Three single rod planetary gears P1, P2, P3 are provided. Here the first planetary gears P1 and the second planetary gears P2 are constructed as negative planetary gears. The third planetary gears P3 are constructed as positive planetary gears in accordance with the invention. It is also possible that the second planetary gears P2 and the third planetary gears P3 are combined as Ravigneaux planetary gears with common rod and common annulus.

As is apparent from FIGS. 1 and 2, only six switching elements, namely, two brakes 03, 04, and four clutches 14, 16, 37 and 57 are provided.

A selective shifting of seven forward gears and one reverse gear can be realized by means of the shifting elements. The multi-step reduction gear of the invention accordingly consists of a total of seven rotating shafts, namely, the shafts 1, 2, 3, 4, 5, 6, and 7.

In accordance with the invention, it is provided with the multi-step reduction gear, in accordance with FIG. 1, that the drive takes place through shaft 1, which is continuously connected with the sun wheel of the first planetary gears P1. The output takes place through shaft 2, which is connected with the annulus of the second planetary gears P2 and the annulus of the third planetary gears P3. Furthermore, shaft 3 is continuously connected with the rod of the first planetary gears and shaft 4 is continuously connected with the rod of the second planetary gears P2 and the rod of the third planetary gears P3. In addition, shaft 5 is continuously connected with the annulus of the first planetary gears P1. The further rotating shaft 6 is continuously connected with the sun wheel of the third planetary gears P3 and the shaft 7 with the sun wheel of the second planetary gears P2 in accordance with the invention.

With the multi-step reduction gear of the invention, the shaft 3 can be coupled onto the housing G through the brake 03, and the shaft 4 through the brake 04. The clutch 14 connects shaft 1 and shaft 6 detachably with one another. Shaft 1 and shaft 6 are detachably connected with each other through clutch 16. Furthermore, clutch 37 detachably connects shafts 3 and 7, and clutch 57 detachably connects shafts 5 and 7 with each other.

A further embodiment of the multi-step reduction gear of the invention is shown in FIG. 2. Hereby, the planetary gears P1, P2 and P3 are constructed as negative planetary gears. A further difference from the embodiment of FIG. 1 consists in that the output shaft 2 is connected with the annulus of the second planetary gears P2, and the rod of the third planetary gears P3, and in that shaft 4 is continuously connected with the rod of the second planetary gears P2 and the annulus of the third planetary gears P3.

A shifting diagram of the multi-step reduction gear of the invention in accordance with FIGS. 1 and 2 is represented in FIG. 3. Respective reductions i of the individual gear stages, and stage progressions φ to be determined on the basis of them, can be inferred by way of example. Furthermore, it can be inferred from the shifting diagram that double shifts can be avoided with sequential modes of shifting, since two adjacent gear steps respectively use two shifting elements in common.

The brake 03 is continuously closed for the seven forwards gear. In addition, brake 04 and clutch 57 are activated for the first gear; for second gear, brake 04 and clutch 16; for the third gear, clutch 16 and clutch 57; for the fourth gear, clutches 16 and 37; for the fifth gear, clutches 14 and 16; for the sixth gear, clutches 14 and 37; and for the seventh gear, clutches 14 and 57. In reverse gear R, brake 04 and clutches 37 and 57 are activated as shift elements.

Figure 10:
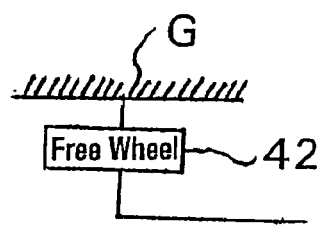
FIG. 10 is a diagrammatic view of the multi-step transmission having a free wheel.

In accordance with the invention, it is possible to provide a free wheel 42 at each suitable position of the multi-step reduction gear transmission, for example, to be connected between a shaft and the housing G, as shown in FIG. 10, or about two shafts if need be.

Figure 13:
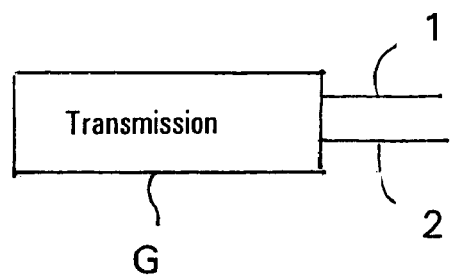
FIG. 13 is a diagrammatic view showing the input and the output on the same side of the transmission housing.

Moreover, it is possible through the mode of construction of the invention to arrange the drive and the output shafts (1, 2), as shown in FIG. 13, on the same side of the transmission or the housing preferably for transverse, frontal, longitudinal, back longitudinal or all wheel arrangements. Moreover, one of an axle differential and a distributor differential can be arranged on the drive side, or on the output side, as shown in FIG. 4.

Figure 5:
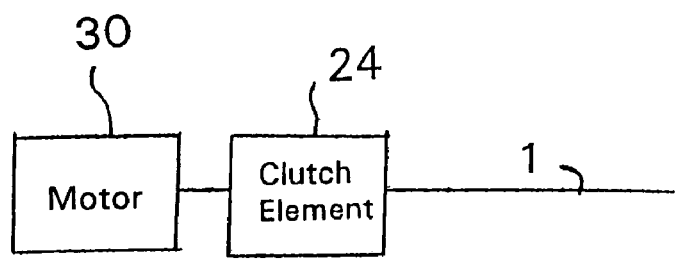
FIG. 5 is a diagrammatic view of the multi-step transmission with a clutch element and a motor.
Figure 6:
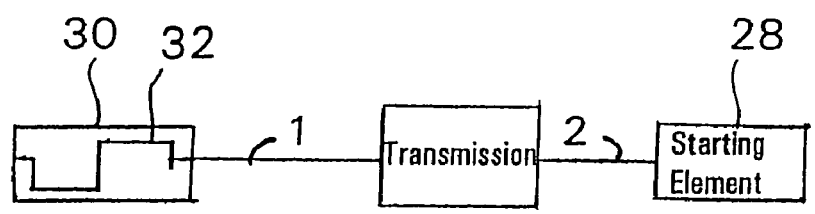
FIG. 6 is a diagrammatic view of the multi-step transmission located between a starting element and a motor.
Figure 7:
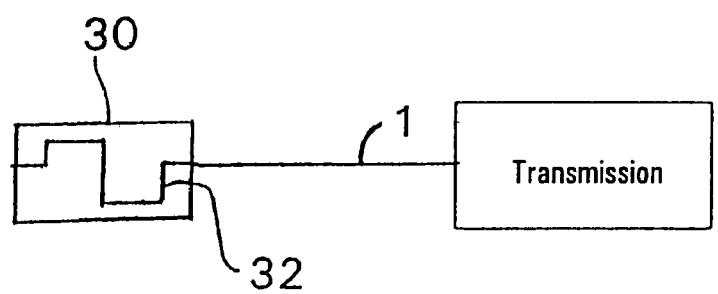
FIG. 7 is a diagrammatic view of the multi-step transmission for a front-transverse installation with a motor.

The drive shaft 1 can be separated by a clutch element 24 from a drive motor 30, as needed, within the framework of an advantageous further development, as shown in FIG. 5, whereby a hydrodynamic converter, a hydraulic clutch, a dry starting clutch, a wet starting clutch, a magnetic powder clutch or a centrifugal force clutch can be used as the clutch elements. It is also possible to arrange a starting element 28 of this type behind the transmission in the flow of force direction whereby, in this case, the drive shaft 1 is continuously connected with the crankshaft 32 of the motor 30, as shown in FIGS. 6 and 7. The start up can take place using a shifting element of the transmission. Preferably the brake 04, which is activated in the first forward gear, as well as in the first reverse gear, can be used as the starting element.

Figure 8:
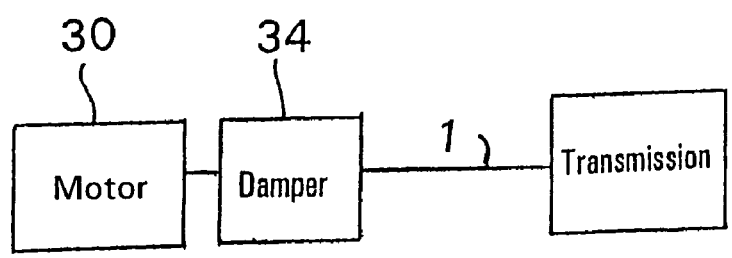
FIG. 8 is a diagrammatic view of the multi-step transmission with a motor and a damper.

The multi-step reduction gear of the invention enables the arrangement of a torsion vibration damper 34 between the motor 30 and the multi-step reduction gear transmission, as shown in FIG. 8.

Figure 9:
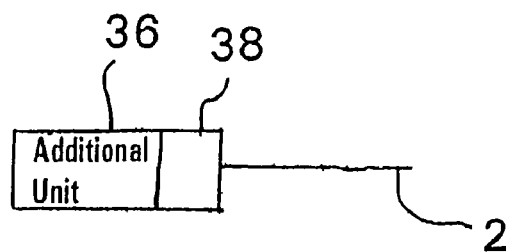
FIG. 9 is a diagrammatic view of the multi-step transmission with an auxiliary output for an additional unit.
Figure 12:
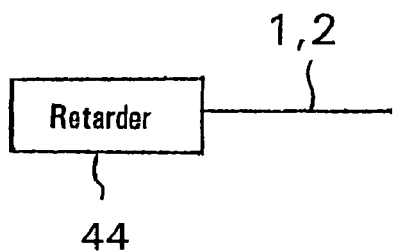
FIG. 12 is a diagrammatic view of one of the shafts having a retarder.

A wear-free brake 44, such as a hydraulic or electric retarder or the like, can be arranged on any shaft, preferably on the drive shaft 1 or the output shaft 2, as shown in FIG. 12, which is especially of significance for use in commercial motor vehicles within the framework of a further embodiment. Furthermore, an auxiliary output can be provided preferably on the drive shaft 1 or the output shaft 2, as shown in FIG. 9, for driving an additional unit 36 on each shaft.

The shifting elements used can be constructed as load-shifting clutches or brakes. In particular, force-locking clutches or brakes such as disk clutches, strap brakes and/or cone clutches, can be used. Furthermore, form-locking brakes and/or clutches, such as synchronizations or claw clutches, can be used as the shifting elements.

Figure 11:
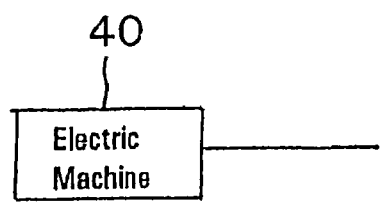
FIG. 11 is a diagrammatic view of the multi-step transmission with an electric machine.

A further advantage of the multi-step reduction gear presented here consists in that an electric machine 40 can be installed on each shaft as a generator and/or as an additional drive machine, as shown in FIG. 11.

The functional features of the claims can be constructionally built in more different types of ways. These constructional development possibilities are not being explicitly described for the sake of simplicity. Obviously, each constructional development of the invention, nonetheless, falls under the scope of protection of the claims, especially any spatial arrangement of the planetary gears or the shifting elements in themselves or toward one another and to the extent to which they are technically appropriate.

REFERENCE NUMERALS 1 shaft
2 shaft
3 shaft
4 shaft
5 shaft
6 shaft
7 shaft
03 brake
04 brake
14 clutch
16 clutch
37 clutch
57 clutch
P1 planetary gears
P2 planetary gears
P3 planetary gears
An drive
Ab output
i reduction
φ step progression
G housing

The invention claimed is:

1. A multi-step reduction gear transmission of a planetary construction for a motor vehicle, the multi-step reduction gear including:
   a drive shaft (1) and an output shaft (2) which are arranged in a housing (G),
   first, second and third planetary gear sets (P1, P2, P3),
   at least third, fourth, fifth, sixth and seventh rotating shafts (3, 4, 5, 6, 7), as well as at least six shifting elements (03, 04, 14, 16, 37, 57), including first and second brakes (03, 04) and first second, third, and fourth clutches (14, 16, 37, 57), whose selective engagement brings about different reduction ratios between the drive shaft (1) and the output shaft (2) so that seven forward gears and one reverse gear can be realized,
   wherein drive takes place through the drive shaft (1) which is continuously connected with a sun wheel of the first planetary gears (P1), output takes place through the output shaft (2) which is continuously connected with an annulus of the second planetary gear set (P2) and a first element of the third planetary gear set (P3), the third shaft (3) is continuously connected with a planet carrier of the first planetary gears (P1), the fourth shaft (4) is continuously connected with a planet carrier of the second planetary gears (P2) and also with a further element of the third planetary gear set (P3), the fifth shaft (5) is continuously connected with an annulus of the first planetary gear set (P1), the sixth shaft (6) is continuously connected with a sun wheel of the third planetary gear set (P3), the seventh shaft (7) is continuously connected with a sun wheel of the second planetary gear set (P2), and the third shaft (3)

can be coupled to the housing (G) via the first brake (03), the fourth shaft (4) can be coupled to the housing (G) via the second brake (04), the first clutch (14) detachably connects the drive shaft (1) and the fourth shaft (4) with one another, the second clutch (16) detachably connects the drive shaft (1) and the sixth shaft (6) with one another, the third clutch (37) detachably connects the third shaft (3) and the seventh shaft (7) with one another, and the fourth clutch (57) detachably connects the fifth shaft (5) and the seventh shaft (7) with one another.

2. The multi-step reduction gear transmission according to claim 1, wherein the first element of the third planetary gear set is a planet carrier of the third planetary gear set, the further element of the third planetary gear set is an annulus of the third planetary gear set, and the first, the second and the third planetary gear sets are negative planetary gears.

3. The multi-step reduction gear transmission according to claim 1, wherein the drive and the output shafts (1, 2) are provided on a same side of the housing (G).

4. The multi-step reduction gear transmission according to claim 1, wherein one of an axle and a distributor differential is arranged on one of a drive side and an output side of the housing (G).

5. The multi-step reduction gear transmission according to claim 1, wherein a torsion vibration damper is arranged between a motor and the multi-step reduction gear transmission.

6. The multi-step reduction gear transmission according to claim 1, wherein a wear-free brake is arranged on at least one of the drive, the output, the third, the fourth, the fifth, the sixth and the seventh shafts (1, 2, 3, 4, 5, 6, 7).

7. The multi-step reduction gear transmission according to claim 1, wherein at least one of the six shifting elements is a form-locking brake, and at least one of the six shifting elements is a form-locking clutch.

8. The multi-step reduction gear transmission according to claim 1, wherein an electrical machine is installed on at least one of the drive, the output, the third, the fourth, the fifth, the sixth and the seventh shafts (1, 2, 3, 4, 5, 6, 7) as at least one of a generator and an additional drive machine.

9. The multi-step reduction gear transmission according to claim 1, wherein the first element of the third planetary gear set is an annulus of the third planetary gear set, the further element of the third planetary gear set is a planet carrier of the third planetary gear set, the first planetary gear set and the second planetary gear set are negative planetary gear sets, and the third planetary gear set is a positive planetary gear set.

10. The multi-step reduction gear transmission according to claim 9, wherein the second planetary gear set (P2) and the third planetary gear set (P3) are combined as a compound planetary gear set with a common planet carrier and a common annulus.

11. The multi-step reduction gear transmission according to claim 1, wherein the multi-step reduction gear transmission includes a free wheel.

12. The multi-step reduction gear transmission according to claim 11, wherein the free wheel is provided between at least one of the drive, the output, the third the fourth, the fifth, the sixth and the seventh shafts (1, 2, 3, 4, 5, 6, 7) and the housing (G).

13. The multi-step reduction gear transmission according to claim 1, wherein the drive shaft (1) is separable from a motor by a clutch element.

14. The multi-step reduction gear transmission according to claim 13, wherein the clutch element is one of a hydrodynamic converter, a hydraulic clutch, a dry starting clutch, a wet starting clutch, a magnetic powder clutch and a centrifugal clutch.

15. The multi-step reduction gear transmission according to claim 14, wherein an external starting element is arranged in a power flow direction downstream of the multi-step reduction gear transmission and the drive shaft (1) is fixedly connected with a crankshaft of the motor.

16. The multi-step reduction gear transmission according to claim 1, wherein starting takes place using three of the at least six shifting elements (03, 04, 14, 16, 37, 57) of the multi-step reduction gear transmission, and the drive shaft (1) is continuously connected with a crankshaft of a motor.

17. The multi-step reduction gear transmission according to claim 16, wherein the fourth clutch and the second brake are used as shifting elements for starting the multi-step reduction gear transmission.

18. The multi-step reduction gear transmission according to claim 1, wherein an auxiliary output is arranged on at least one of the drive, the output, the third, the fourth, the fifth, the sixth and the seventh shafts (1, 2, 3, 4, 5, 6, 7) for driving an additional unit.

19. The multi-step reduction gear transmission according to claim 18, wherein the auxiliary output is arranged on one of the drive shaft (1) and the output shaft (2).

20. The multi-step reduction gear transmission according to claim 1, wherein at least one of the six shifting elements is a load-shifting clutch, and at least one of the six shifting elements is a load-shifting brake.

21. The multi-step reduction gear transmission according to claim 20, wherein the six shifting elements (03, 04, 14, 16, 37, 57) are one of disk clutches, strap brakes and cone clutches.

* * * * *